United States Patent
Dong et al.

(10) Patent No.: US 10,429,189 B2
(45) Date of Patent: *Oct. 1, 2019

(54) METHOD AND APPARATUS OF DATA CLASSIFICATION FOR ROUTES IN A DIGITIZED MAP

(71) Applicant: International Business Machines Corporation, Armonk, NY (US)

(72) Inventors: Wei Shan Dong, Beijing (CN); Ning Duan, Beijing (CN); Peng Gao, Beijing (CN); Zhi Hu Wang, Beijing (CN); Jun Chi Yan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,034

(22) Filed: Sep. 18, 2018

(65) Prior Publication Data

US 2019/0017825 A1    Jan. 17, 2019

Related U.S. Application Data

(63) Continuation of application No. 15/228,515, filed on Aug. 4, 2016.

(51) Int. Cl.
*G01C 21/00* (2006.01)
*G06F 16/29* (2019.01)
(Continued)

(52) U.S. Cl.
CPC .......... *G01C 21/005* (2013.01); *G01C 21/30* (2013.01); *G06F 16/29* (2019.01); *G06F 16/9537* (2019.01)

(58) Field of Classification Search
CPC .............. G06F 16/9537; G06F 16/29; G06F 17/30241; G06F 17/3087; G01C 21/005
See application file for complete search history.

(56) References Cited

U.S. PATENT DOCUMENTS 6,470,265 B1 * 10/2002 Tanaka .................. G01C 11/00
                                                  701/532
8,359,156 B2 *  1/2013 Guo ....................... G01C 21/32
                                                  701/411
(Continued)

FOREIGN PATENT DOCUMENTS

CN     101464158 B    4/2011
CN     101308029 B    3/2013

OTHER PUBLICATIONS

Worrall et al., Automated Process for Generating Digitised Maps through GPS Data Compression, ACRA, Dec. 10, 2007, pp. 1-8.
(Continued)

*Primary Examiner* — Behrang Badii
*Assistant Examiner* — Daniel L Greene
(74) *Attorney, Agent, or Firm* — Scully, Scott, Murphy & Presser, PC; Grant Johnson, Esq.

(57) ABSTRACT

A method and system obtaining positioning data from an object traveling on a plurality of routes; mapping the data into a plurality of points on a digital map; identifying points that are unmatched to the stored route trajectory; obtaining candidate transition points from the unmatched points; aggregating the candidate transition points by applying a clustering algorithm; selecting a first cluster of points and a plurality of second clusters of points, determining a confidence level that the first cluster of points are transition points indicating a transition between the routes, classifying the first cluster of points as a first plurality of traveling points having a first direction in response to the confidence being below a threshold confidence and automatically adjusting the stored route trajectory to indicate that the first cluster of points are on the route trajectory.

18 Claims, 4 Drawing Sheets

(51) Int. Cl.
*G06F 16/9537* (2019.01)
*G01C 21/30* (2006.01)

(56) References Cited

U.S. PATENT DOCUMENTS

| | | | |
|---|---|---|---|
| 9,261,376 B2* | 2/2016 | Zheng | G01C 21/3484 |
| 9,558,660 B1* | 1/2017 | Fowe | G08G 1/0112 |
| 2005/0162312 A1 | 7/2005 | Riday | |
| 2008/0228826 A1 | 9/2008 | Dorum et al. | |
| 2009/0140886 A1 | 6/2009 | Bender | |
| 2011/0029475 A1* | 2/2011 | Gionis | G06N 99/005 |
| | | | 706/52 |
| 2012/0143882 A1* | 6/2012 | Zheng | G06F 17/30241 |
| | | | 707/751 |
| 2012/0253862 A1 | 10/2012 | Davidson | |
| 2013/0100286 A1 | 4/2013 | Lao | |
| 2013/0321392 A1 | 12/2013 | van der Merwe et al. | |
| 2013/0325340 A1 | 12/2013 | Forstall et al. | |
| 2014/0128093 A1 | 5/2014 | Das et al. | |
| 2014/0278055 A1* | 9/2014 | Wang | G01C 21/32 |
| | | | 701/409 |
| 2014/0324337 A1 | 10/2014 | Bjemetun et al. | |

OTHER PUBLICATIONS

List of IBM Patents or Patent Applications Treated as Related dated Sep. 18, 2018, pp. 2.

Office Action from related U.S. Appl. No. 15/228,515, filed Aug. 4, 2016, 25 pages.

Patel et al., "The Best Clustering Algorithms in Data Mining", International Conference on Communication and Signal Processing, Apr. 6-8, 2016, pp. 2042-2046, https://ieeexplore.ieee.org/document/7754534.

* cited by examiner

METHOD AND APPARATUS OF DATA CLASSIFICATION FOR ROUTES IN A DIGITIZED MAP

BACKGROUND

This disclosure is directed to data classification for routes in a digitized map and more particularly to automatically adjusting the digital map based on the data classification.

A positioning device carried on an object, such as a vehicle or pedestrian, can be used to sense positioning data indicating locations of the object. The positioning data can be mapped on a digital map as points. In the case that map contains information for routes, the points can be matched to one or more routes on the map. In this way, by sensing the positioning data over time, a trajectory of the object can be obtained and traced. Trajectory tracking has been widely used in many situations such as fleet management, map maintenance, or the like. As an example, it is possible to implement real-time bus monitoring, real-time bus arrival alerting, and the like. For instance, in the real-time bus monitoring, operation status of a bus may be monitored in real time based on the trajectory tracking of the bus. As another example, the accuracy of route information map can be detected by trajectory tracking. In trajectory tracking, an important and fundamental task is to accurately identify "transition points" which indicate the transitions between routes.

SUMMARY

Example embodiments of the present disclosure provide a method, a device, and a computer program product for classifying points on a map.

In an aspect, a computer-implemented method is provided for tracking the route trajectory of a traveling object comprising: obtaining positioning data from a positioning device carried on each of a respective at least one traveling object traveling on a plurality of routes; mapping the positioning data into a plurality of points on a digital map, the digital map including a stored route trajectory along at least two of the plurality of routes, the at least two plurality of routes having different route directions, each point of the plurality of points having a traveling direction indicated by the positioning data; identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions; obtaining candidate transition points from the plurality of unmatched points on the digital map; aggregating the plurality of candidate transition points by applying a clustering algorithm; selecting a first cluster of points and a plurality of second clusters of points from the aggregated clusters of points; determining a confidence level of whether the first cluster of points are transition points indicating a transition between the at least two plurality of routes; classifying the first cluster of points as a plurality of traveling points having a first direction in response to the confidence level being below a threshold confidence; and automatically adjusting the stored route trajectory to indicate that the first cluster of points are on the route trajectory.

In another aspect, a device is provided. A device comprising a processing unit; a memory coupled to the processing unit and storing instructions thereon, the instructions, when executed by the processing unit, performing acts including obtaining positioning data from a positioning device carried on each of a respective at least one traveling object traveling on a plurality of routes; mapping the positioning data into a plurality of points on a digital map, the digital map including a stored route trajectory along at least two of the plurality of routes, the at least two plurality of routes having different route directions, each point of the plurality of points having a traveling direction indicated by the positioning data; identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions; obtaining candidate transition points from the plurality of unmatched points on the digital map; aggregating the plurality of candidate transition points by applying a clustering algorithm; selecting a first cluster of points and a plurality of second clusters of points from the aggregated clusters of points; determining a confidence level of whether the first cluster of points are transition points indicating a transition between the at least two plurality of routes; classifying the first cluster of points as a plurality of traveling points having a first direction in response to the confidence level being below a threshold confidence; and automatically adjusting the stored route trajectory to indicate that the first cluster of points are on the route trajectory.

In yet another aspect, a computer program product is provided. A computer program product being tangibly stored on a non-transient machine-readable medium and comprising machine-executable instructions, the instructions, when executed on a device, causing the device to perform obtaining positioning data from a positioning device carried on each of a respective at least one traveling object traveling on a plurality of routes; mapping the positioning data into a plurality of points on a digital map, the digital map including a stored route trajectory along at least two of the plurality of routes, the at least two plurality of routes having different route directions, each point of the plurality of points having a traveling direction indicated by the positioning data; identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions; obtaining candidate transition points from the plurality of unmatched points on the digital map; aggregating the plurality of candidate transition points by applying a clustering algorithm; selecting a first cluster of points and a plurality of second clusters of points from the aggregated clusters of points; determining a confidence level of whether the first cluster of points are transition points indicating a transition between the at least two plurality of routes; classifying the first cluster of points as a plurality of traveling points having a first direction in response to the confidence level being below a threshold confidence; and automatically adjusting the stored route trajectory to indicate that the first cluster of points are on the route trajectory.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
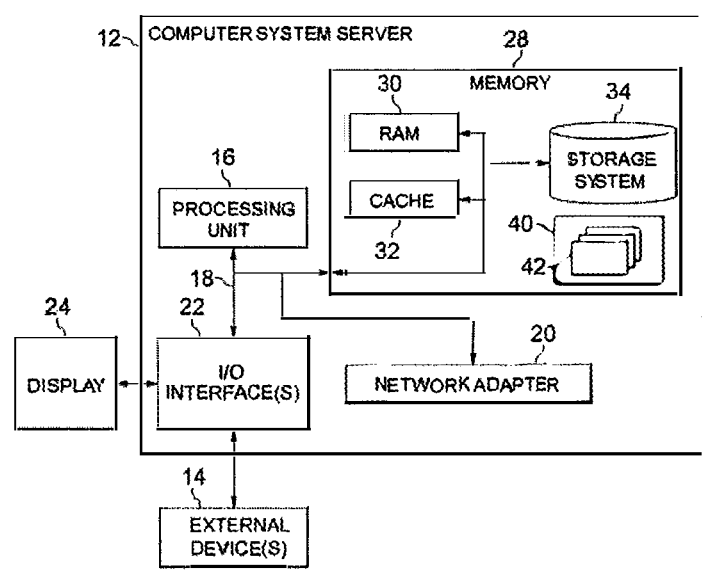
FIG. 1 is a block diagram of an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

As described above, in trajectory tracking, the fundamental task is to correctly and accurately identify the transition points. The transition points are corresponding to one or more transitions between the routes. As used herein, a transition refers to a location or a travel distance where an entity transits between routes having different route directions on the map. That is, a transition point is located between the end of one route and the beginning of another route. In order to obtain updating information on the routes on the map to achieve effective and efficient fleet management, the conventional approaches depend upon manual labor for observations and measurements by human users. For example, a vehicle provided with the positioning device may periodically travel along roads to detect changes associated with the roads. If a change of a road is found, the corresponding route on the map may be adjusted accordingly. Then, the points on the map may be matched with the changed route. However, such a manual update and maintenance of the routes on the map is inefficiency in terms of both time and cost especially when the roads changes frequently, for example, due to needs of city development, city constructions, and the like.

In order to address the above and other potential problems, embodiments of the present disclosure provide an effective and efficient solution for identifying transition points on the digital map. Generally speaking, the proposed solution works on the basis of category of points on the map, which will be explained with reference to FIG. 2.

As described above, positioning data sensed by the positioning device carried on the object can be mapped into points on the digital map. Then the mapped points of the object can be matched to one or more routes on the map. Each point has a traveling direction which can be indicated by the positioning data, for example. The traveling directions for the points on the map can be saved as metadata. The points on the map can be matched to the routes based on the distances between the points and the routes as well as the traveling directions of the points and the route directions. More particularly, if the distance between a point and a route is short enough and the traveling direction of the point is consistent with the direction of the route, then the point is matched to that route. In the context of the present disclosure, such a point is referred to a "matched point" or a "traveling point" which indicates that the respective object is moving along the route.

Figure 2:
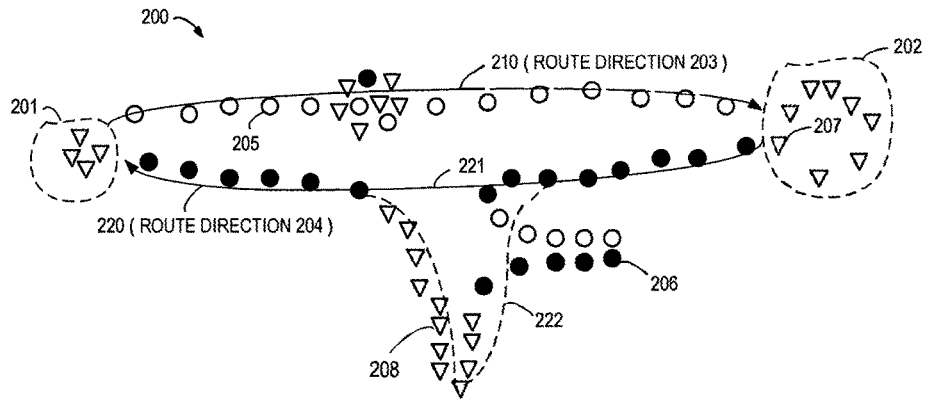
FIG. 2 is an example map to which embodiments of the present disclosure are applicable.

In FIG. 2, the points shown by solid circles such as the point 206 are traveling points that are matched to the route 210 or 220. In this example, the routes 210 and 220 have different directions 203 and 204, respectively. It can be seen that in the map matching, a certain degree of tolerance is given. More particularly, although the point 206 is separated from the route 220, it can be considered as a traveling point because its distance to the route 220 is below the threshold distance (referred to as "first threshold distance").

The points on the map other than the matched points are referred to "unmatched points." It would be appreciated that the unmatched points may include points that are separated from a route by distances exceeding a predefined threshold distance, such as points 208 as shown in FIG. 2. Alternatively, or in addition, the unmatched points may include points with directions inconsistent with the route directions, such as points 207.

According to embodiments of the present disclosure, potential or candidate transition points are identified from those unmatched points. Then the confidence of these candidate transition points will be verified to check whether they actually represent transition points one the map. If one or more candidate transition points are determined to have low confidence, it means that these candidate transition points, such as the point 208 in FIG. 2, are not real transition points. In some embodiments, such points can be classified as traveling points. However, as mentioned above, these points are unmatched with any routes on the map. As a result, it can be determined that some problem occurs such as the map data is not up-to-date and/or the respective entities that are sensing the positioning data are not traveling along the predetermined routes. On the other hand, the candidate transition points with high confidence, such as the point 207 in FIG. 2, are be classified as real transition points, as will be described below.

To this end, according to embodiments of the present disclosure, the unmatched points are categorized as the following three types of points: (1) points that are separated from the routes by the distances exceeding the first threshold distance, such as the point 208; (2) points that are located between the routes but inconsistent with the route directions, such as the point 207; and (3) points that are located on one of the routes but have directions inconsistent with the respective route directions.

Among these types of points, the points of the first type indicate that the object is leaving the routes. The points of the second type are referred to as "transition points" which represent a transition between the routes. The points of third type indicate that the object stops moving along the routes which are referred to as "stopping points" representing a stop along the routes. According to embodiments, the unmatched points of the first or second type will be selected as candidate transition points. By verifying the confidence, these two types of points can be separated from each other, such that the unmatched points having high confidence, such as the clusters of points 201 and 202 are classified as the real transition points. The existence of unmatched points like the point 208 (if any) may indicate a problem to be handled. For example, the map data may be out of date, or the entity may be traveling out of the predefined routes. Additionally, in some embodiments, the points of the third type may be assigned with a direction and classified as special traveling points.

In the example shown in FIG. 2, it is assumed that the routes 210 and 220 together form a bus line. Accordingly, points on the map 200 can be generated based on positioning data acquired by one or more buses equipped with positioning devices. As shown, the points 205 and 206 are traveling points whose directions are consistent with the route direction 203 and 204, respectively. The unmatched points such as points 207 and 208 are separated from the routes 210 and 220 by the distances exceeding the first threshold distance and/or inconsistent with the route directions 203 and 204. The unmatched points 207 may be caused due to following events: the bus stops moving due to traffic lights, traffic congestion and the like; the bus leaves the bus line for reasons such as fuel-up, relaxation, and the like; and the bus line has been changed. In the shown example, a route change from a part 221 of the route 220 to the route 222 occurs. That is, in practice the bus has changed to travel along the route 222 instead of the part 221 of the route 220. However, the map 200 has not yet been updated accordingly. In this case, the trajectory of the bus is still traced by matching the points on the map with the part 221 of the route 220. As a result, the point 208 is unmatched with any routes. Such kind of problem may significantly degrade the accuracy of the trajectory trace of the bus.

By detecting transition points according to embodiments of the present disclosure, the above problems can be identified and handled. It is to be understood that the example scenario of the bus trace is described above only for the purpose of illustration, without suggesting any limitations as to the scope of the disclosure. Embodiments of the present disclosure may be implemented in any other suitable application where a trajectory of an object needs to be traced.

Figure 3:
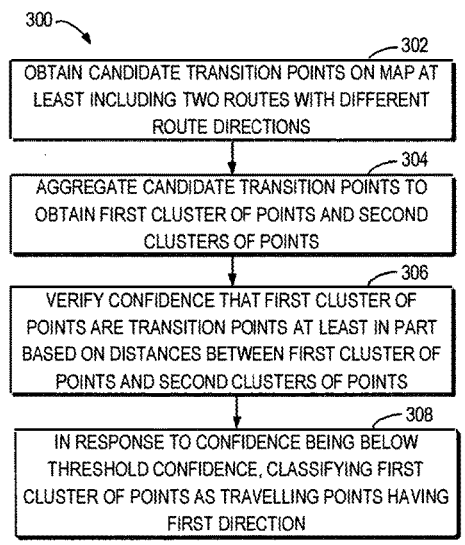
FIG. 3 is a flowchart of an example method for classifying points on a map in accordance with some embodiments of the present disclosure.

FIG. 3 shows a flowchart of an example method 300 for classifying the points on the map in accordance with some embodiments of the present disclosure. The method 300 may be used to process the points on the map 200 illustrated in FIG. 2. As described above, the points on the map are obtained by mapping the positioning data acquired by one or more entities. As used herein, the term "entity" refers to any object or device whose location can be sensed. Examples of an entity include, but are not limited to, a motor vehicle, rickshaw, pedestrian, and the like. In particular, in the context of the present disclosure, when the same vehicle or pedestrian travels along the same route at different time, the vehicle or pedestrian will be regarded as two different entities.

An entity may be equipped with a location sensing device, such as a Global Navigation Satellite System (GNSS) device. Examples of GNSS include, but not limited to, one or more of the following: Global Positioning System (GPS), Galileo positioning system, Beidou navigation positioning system, and the like. With the location sensing device, each entity may obtain positioning data of a plurality of locations during the traveling process. In one embodiment, the positioning data, for example, may be altitude and latitude data. Optionally, the positioning data may also comprise velocity data and direction data and the like of the entity at a corresponding location In step 302, candidate transition points on the map 200 are obtained. The candidate transition points includes points that are separated from the routes 210 and 220 by distances exceeding the first threshold distance, and/or points that are located between the routes 210 and 220 but inconsistent with the route directions 203 and 204.

As described above, in the case that a change associated with the actual road occurs, if the corresponding route on the map is not timely changed, the unmatched points occur. The candidate transition points can be determined from the unmatched points. For example, in some embodiments, the following unmatched points can be selected as the candidate transition points: points that are separated from the routes 210 and 220 by the distances exceeding the first threshold distance, and/or points that are inconsistent with the route directions 203 and 204. To this end, in some embodiments, the candidate transition points can be obtained in step 302 by first determining unmatched points on the map and then excluding those unmatched points located on the routes but having directions inconsistent with the respective route directions. That is, the unmatched points of the third type (stopping points) as described above are excluded, and the remaining unmatched points of the first and second types are used as candidate transition points.

Then, in step 304, the candidate transition points are aggregated to obtain a first cluster of points and a plurality of second clusters of points. The candidate transition points may be aggregated according to many factors. The aggregation may be implemented by clustering algorithms, either currently known or to be developed in the future, or any other approaches. In some embodiments, distances between the candidate transition points may be used for point aggregation. For example, the candidate transition points having short distances therebetween may be aggregated together. In such embodiments, if a distance between two candidate transition points is below a threshold distance, the two candidate transition points may be aggregated into one cluster of points. The threshold distance for the aggregating may be set as any suitable distance according to practical requirements. Alternatively, or in addition, in some embodiments, the aggregation of the candidate transition points may be further based on the acquisition time of the associated positioning data. For example, if a sequence of positioning data, which correspond to some candidate transition points, is acquired sequentially in a predefined time interval, these candidate transition points may be aggregated together.

After the candidate transition points are aggregated into a plurality of clusters of points, the first and second clusters of points may be selected from these clusters of points. For example, the first cluster of points may be generated based on positioning data acquired by a first entity, and the second clusters of points may be generated based on positioning data acquired by one or more second entities different from the first entity. As an alternative example, the first and second clusters of points may be generated based on the positioning data acquired by one entity when traveling along the routes many times.

Next, the method 300 proceeds to step 306, where a confidence of the first cluster of points is verified. As used herein, the term "confidence" refers to the possibility that a cluster of points indeed represents a transition indicating the entity is transiting from one route to another route. A high confidence indicates that the cluster of points is more likely to be the transition points, and vice versa. According to embodiments, the confidence is verified at least in part based on distances between the first cluster of points and the second clusters of points. To this end, various approaches can be used to determine the distance between the first and second clusters of points.

For example, in some embodiments, the Euclidean distance between geometric centers of the first and second clusters of points may be calculated as the distance. The geometric center of a cluster of points may be determined in a variety of ways. For example, in one embodiment, it is possible to determine a bounding box of the respective cluster of points and then use the center of the bounding box as the geometric center. Alternatively, a shape defined by a boundary of the cluster of points can be determined and the symmetric center of the shape can be used as the geometric center. As another example, the distance between the first and second clusters of points may be calculated based on a distance between two reference points in the two clusters of points.

The distances between the first cluster of points and the second clusters of points may be used in a variety of manners to verify the confidence of the first cluster of points. In some embodiments, the confidence of the first cluster of points may be verified based on a number of proximate clusters of points with respect to the first cluster of points from among the second clusters of points. For example, a proximate cluster of points will be selected from among the plurality of second clusters of points if the distance between the first cluster of points and the proximate cluster of points is below a threshold distance (referred to as "second threshold distance"). The second threshold distance for the verification may be set according to practical requirements or any other relevant factors. Then, the selected proximate clusters of points are counted. If the number of the proximate clusters of points exceeds a threshold number, the confidence of the first cluster of points may be determined to be high. This indicates that it is quite possible that the first cluster of points indeed represents a transition between the routes.

Otherwise, if the number of the proximate clusters of points is below the threshold number, the confidence of the first cluster of points is determined low. This indicates that the first cluster of points does not represent a transition between the routes.

In addition to the distances between the first and second clusters of points, the confidence of the first cluster of points may be verified further based on the comparison of travel distances between two positions along different routes. More particularly, as shown in FIG. 2, the routes 202 and 203 are paired to form a bus line and have opposite directions. A predetermined reference transition may be used as a landmark. The predetermined reference transition represents the transition between the routes with opposite directions. Then a first travel distance from the first cluster of points to the predetermined reference transition along the route 202 may be determined. Additionally, a second travel distance from the predetermined reference transition to the first cluster of points along the route 203 may be determined. The first and second travel distances are compared to one another. If their difference is below a threshold difference, then it can be considered that confidence for the first cluster of points is high enough, that is, above the threshold confidence. Otherwise, the confidence may be determined to be low. Such embodiments work on the basis of an observation that the travel distances along two paired routes with opposite directions are often similar. Accordingly, the reference transition zone may be any suitable transition between routes having nearly equal distances to and from the first cluster of points.

Alternatively, or in addition, the confidence of the first cluster of points may be verified based on reference information obtained from a user input. For example, a user may specify the confidence of the first cluster of points, for example, based on known information on associated route changes. As an alternative example, the routes may be investigated or measured on the spot to determine whether the first cluster of points indeed represents a transition. Then, the investigations may be input by the user. The verification of the confidence based on the user input may further increase accuracy of the verification.

In the case that the confidence is determined to be below a threshold confidence, the method 300 proceeds to step 308, where the first cluster of points is classified to be traveling points. For the purpose of discussion, the classified traveling points will be referred to as first traveling points having a first direction. If the confidence is determined to exceed the threshold confidence, the first cluster of points is classified as the transition points.

In some embodiments, the first direction may be determined based on directions of proximate traveling points with respect to the first cluster of points. These proximate traveling points can be referred to as a second plurality of traveling points. For example, the first direction of the first cluster of points may be determined to be a dominant direction of the proximate traveling points. In the context of the present disclosure, a dominant direction refers to a direction of the majority points in a set of points.

In one embodiment, a set of proximate traveling points are obtained based on the distances between these traveling points and the first cluster of points. The distances between the proximate traveling points and the first cluster of points are below a threshold distance (as referred to as "third threshold distance"). If the number of the traveling points having a specific direction from among of the proximate traveling points exceeds a threshold number, the specific direction may be determined as the dominant direction of the proximate traveling points.

Alternatively, in some other embodiments, the first direction of the first cluster of points may be determined based on a user input in order to ensure the accuracy of the classification. For example, the user may specify the direction of the first cluster of points based on known information and on-the-spot investigations or measurements on associated route changes.

Through the above discussions, it would be appreciated that in accordance with embodiments of the present disclosure, a confidence of a cluster of points from among candidate transition points may be verified. In response to a low confidence, the cluster of points may be classified to traveling points. In this way, the accuracy of the trajectory tracking may be improved in more effective and efficient way while reducing manpower and material costs.

As mentioned above, if the first cluster of points is classified to the traveling points, it means that the route information of the map might have some errors or be out of date. In this situation, in one embodiment, the route on the map may be adjusted at least in part based on the first classified cluster of points. For example, it may be necessary to add a new route(s) and/or modify an existing route(s). Any route adjustment approaches can be used in connection with embodiments of the present disclosure. It would be appreciated that such route adjusting approach is more effective and efficient compared with the conventional manual way.

In addition to the classification of the candidate transition points, other points such as stopping points and traveling points may also be classified as will be discussed in detail in the following paragraphs. For example, as described above, if an unmatched point is located on a route but has traveling direction inconsistent with the route direction, that point is considered as a stopping point. In some embodiments, depending on the requirements, it is possible to classify the stopping point as a traveling point and assign it with the route direction. Example processes of classifying the points on the map will now be described below with reference to with reference to FIG. 4.

Figure 4:
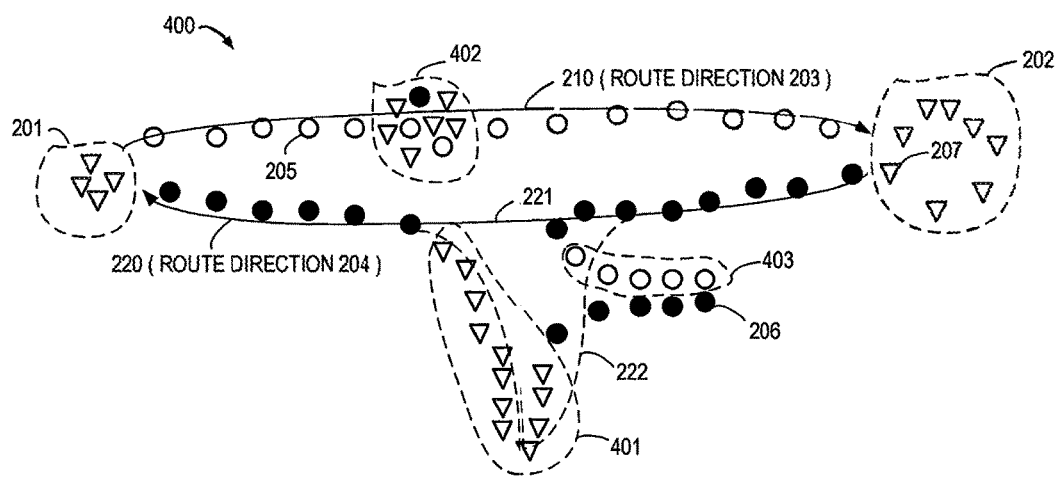
FIG. 4 is a further example map to which embodiments of the present disclosure are applicable.

FIG. 4 shows an example map 400 to which embodiments of the present disclosure are applicable. The map 400 can be considered as a further example implementation of the map 200. The map 400 differs from the map 200 as described above in that some unmatched points 207, as indicated by triangles, on the map 400 have been aggregated into clusters of points 401 and 402.

Similar to the aggregation of the candidate transition points as described above, the unmatched points may be aggregated according to many factors. In this example, the unmatched points 207 are aggregated based on the distances between the unmatched points 207 and the acquisition time of associated positioning data. As shown, the cluster of points 401 is obtained by aggregating the unmatched points that are separated from the routes 210 and 220 by the distances exceeding the first threshold distance, that is, the candidate points. Accordingly, the confidence of the cluster of points 401 is verified. It is to be understood that the processes of the verification as described above with reference to FIG. 3 can also be implemented for the cluster of points 401, and the details thereof will be omitted.

In this example, the cluster of points 401 is determined to have a low confidence, which is caused due to the route change from the part 221 of the route 220 to the route 222. Then, the cluster of points 401 may be classified as traveling points. As shown, most of the traveling points proximate to the cluster of points 401 have the route direction 204. That is, the dominant direction of the traveling points proximate to the cluster of points 401 is route direction 204. As a result, the cluster of points 401 is classified as the traveling points having the route direction 204.

After the cluster of points 401 is classified, from among the traveling points proximate to the cluster of points 401, a traveling point having a direction other than the dominant direction may also be classified based on the dominant direction. More particularly, if the direction of traveling point is different from the dominant direction of the proximate traveling point, then it is possible directly assign the dominant direction to this traveling point. In this example, a set of traveling points 403 have the route direction 203. However, the dominant direction of the traveling points proximate to the set of traveling points 403 is consistent with the route direction 204. As a result, in some embodiments, the directions of the set of traveling points 403 are adjusted to be the route direction 204.

As shown, the cluster of points 402 are obtained by aggregating the unmatched points that are located on the route 210 but inconsistent with the route direction 203, namely, the stopping points representing a stop along the route 210. Due to sensing characteristics of a location sensing device, the points proximate to the stopping points typically have directions that are frequently changed. Accordingly, in this example, in addition to the stopping points, the cluster of points 402 might also include some nearby traveling points. That is, in this example, in aggregating the stopping points into the cluster of points 402, some traveling points are also aggregated together due to these traveling points being proximate to the stopping points in terms of both locations and time.

Then, the cluster of points 402 may also be classified to traveling points. The direction of the stopping points may be determined as the route direction 203 of the located route 210.

Automatically maintaining accurate digitalized routes is critical for the applications in fleet management, such as bus arrival predication, trip planning in online maps, vehicle monitoring, etc. Automatically updating digitalized routes is a task to extract n routes from raw GPS data (usually n=2). The data of different driving directions must be separate from each other before extraction. However, raw GPS data of different routes and directions are usually mixed together without any other advanced fleet management sensor system.

Digitalized routes data typically is a sequence of GPS points representing the routes that the vehicles are actually driving on. A vehicle's accurate location and driving distance can be calculated by matching a vehicle's current GPS location to a location along the route. Manually collecting and maintaining this information can be a time-consuming and costly task. For example, there are usually thousands of routes for a city, and each routes contains hundreds to thousands of GPS points (500,000~1000,000 points for a city). In addition, these routes are always changing, due to the needs of city development, constructions, new metro stations, etc. 7%-20% routes would be changed per month. As a results, 12%-39% of the route information (GPS locations) are in error or out of date.

Digitalized route data is critical to many applications of fleet management, especially in the age of the connected vehicle. Driving directions is critical information for automatic route extraction from raw GPS data. Thus, GPS data classification, which infers the driving directions, is a prerequisite.

Vehicles in a fleet usually have N operational routes. In most cases N=2, based on driving from location A to location B, and then back. Ideally vehicles may have the following status in operation hours:
1. Driving on route 1;
2. Driving on route 2;
3. Stop at location A or location B (transition status).

The goal is for the GPS data points logged from vehicles to be classified into three classes, which can be labeled with 0 (on route 1 ), 1 (on route2 ), −1 (not on route 1 or 2 ).

However, in practical operation conditions, there are many exceptions:
a) GPS/3G/4G signals are unstable. They are easily affected by many factors, e.g.: weather conditions, high buildings, elevated roads, tunnels, bridges . . . So GPS data have many errors.

Due to some other operation needs, like maintenance, refueling, dynamic dispatching etc., there are usually large numbers of noisy trips amount GPS trace data, which are very different from normal traces (driving on route 1 or 2).
3. Existing digitalized routes data is out-of-date. So GPS data points cannot match to any of routes.

Traffic congestions cause the GPS data points stay at one location for a long time (so it may looks like vehicle in transition status).

This is a problem the disclosed invention solves. With the disclosed invention, digitalized routes can be fixed automatically based on only raw GPS data (when they are out-of-date). With the disclosed invention, thousands of routes for a city can be auto-generated based on latest 3-6 days historical GPS data, within 10 hours on normal PC.

Figure 5:
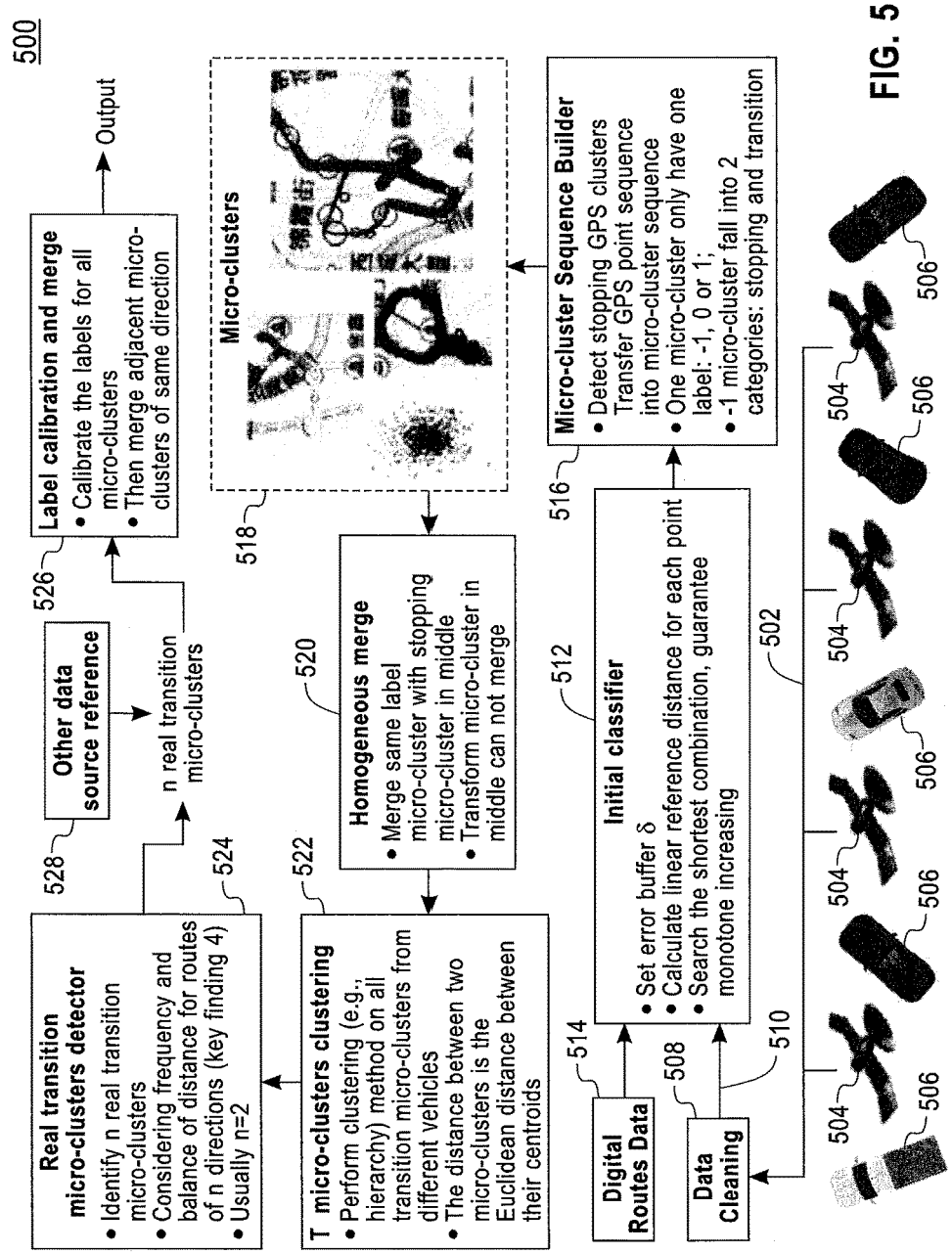
FIG. 5 is a block diagram of one embodiment of a processing apparatus in accordance with some embodiments of the present disclosure.

FIG. 5 is an example of one embodiment of an apparatus 500 of GPS data classification for digitalized routes. One or more features of the apparatus 500 could (without limitation) be implemented as a computer program product embodying one or more program modules 42 (FIG. 1) stored in memory 28 (FIG. 1). As shown in FIG. 5, raw data 502 (vehicle id, locations, timestamps, speeds, driving directions, etc.) from GPS satellites 504 obtained GPS devices on a large number of vehicles 506 from a fleet is obtained. The raw GPS data is cleaned for processing using well known signal processing techniques by data cleaning device 508. The cleaned GPS data 510 is input to Initial Classifier processing module 512. Digitalized routes data 514 that can be inaccurate or out-of-date is also input to classifier module 512. The output is classified GPS data for different routes in which each data point is labeled with route id, or −1, with no label. In fleet management, there are usually preliminary classification results within raw GPS data. Because the task of vehicle monitoring will locate each vehicle (which route the vehicle is driving on). Many existing methods such as Hidden Markov model, dynamic planning or curve matching, can serve as this purpose.

The initially classified GPS data is input to Micro-cluster Sequence Builder module 516. Module 516 identifies the unmatched points and obtains the candidate transition points as described in connection with step 302 of FIG. 3. Module 516 transfers point sequences in the GPS data into micro-cluster sequences. In one embodiment, adjacent GPS points with same label can be merged. One micro-cluster only has one label: −1, 0, 1, . . . , n−1 (n-classification, usually n=2);

−1 micro-cluster fall into 2 categories: stopping and transition. Module 516 also identifies the stopping points. Module 516 determines transition micro-clusters.

Module 516 outputs the micro-cluster data 518 to Homogeneous Merge module 520. Module 520 merges three micro-clusters: two same label micro-clusters with one stopping micro-clusters in the middle. Transition micro-clusters in middle cannot be merged.

Transition micro-clusters are then input to Transition micro-clusters clustering module 522. Module 522 performs a clustering method, such as hierarchy clustering on all transition micro-clusters from different vehicles. As noted above, in one embodiment, the distance between two micro-clusters is the Euclidean distance between their centroids. Module 522 aggregates candidate transition points as described in connection with step 304.

Real transition micro-clusters detector module 524 identifies n real transition micro-clusters as described in connection with step 306. In one embodiment, module 524 considers transition frequency and balance of distance in two half portions of the routes.

The n-real transition micro-clusters are then input to Label calibration and merge module 526. Optionally, other source reference data 528, such as user data, are included to enhance the confidence in the identification of the real transition micro-clusters. Module 526 calibrates the labels for all micro-clusters and classifies the micro-clusters as described in connection with step 308. Module 526 merges adjacent micro-clusters of the same direction. In one embodiment, the labels are generated based on the fact that the label can only change at real transition points in the sequence.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to pedestrianize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for tracking the route trajectory of a traveling object comprising:
    obtaining positioning data from a positioning device carried on each of a respective at least one traveling object traveling on a plurality of routes;
    mapping the positioning data into a plurality of points on a digital map, the digital map including a stored route trajectory along at least two of the plurality of routes, the at least two plurality of routes having different route directions, each point of the plurality of points having a traveling direction indicated by the positioning data;
    identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions;
    obtaining candidate transition points from the plurality of unmatched points on the digital map;
    aggregating the plurality of candidate transition points by applying a clustering algorithm;
    selecting a first cluster of points and a plurality of second clusters of points from the aggregated clusters of points;
    determining a confidence level of whether the first cluster of points are transition points indicating a transition between the at least two plurality of routes;
    classifying the first cluster of points based on the confidence level; wherein
        in response to the confidence level being below a threshold confidence, classifying the first cluster of points as a plurality of traveling points having a first direction; and
        in response to the confidence level being above the threshold confidence, classifying the first cluster of points as the transition points; and
    automatically adjusting the stored route trajectory based on the classification of the first cluster of points.

2. The method of claim 1, wherein the first cluster of points are generated from positioning data obtained from a plurality of the traveling objects traveling on the plurality of routes and the plurality of second clusters of points are generated from positioning data obtained from a single object traveling on the plurality of routes multiple times.

3. The method of claim 1, wherein determining a confidence level comprises selecting, from among the plurality of second clusters of points, clusters of points such that a distance between each of the selected clusters of points and the first cluster of points is below a second threshold distance, and wherein in response to the number of the selected clusters of points being below a threshold number, determining that the confidence is below the threshold confidence.

4. The method of claim 1, wherein the at least two plurality of routes at least include a first route and a second route having opposite directions, and wherein determining a confidence level comprises:
    determining a first travel distance from a first cluster of points to a predetermined reference transition along the first route, the predetermined reference transition representing a transition between the first and second routes;
    determining a second travel distance from the predetermined reference transition to the first cluster of points along the second route; and
    determining a difference between the first and second travel distances; and
    wherein, in response to the difference being below a threshold difference, determining that the confidence level exceeds the threshold confidence.

5. The method of claim 1, wherein the classifying comprises:
    determining the first direction for the first plurality of traveling points by:
        determining a dominant direction of a second plurality of traveling points with respect to the first cluster of points, a distance between each of the second plurality of traveling points and the first cluster of points being below a third threshold distance, the second plurality of traveling points representing movements along the plurality of routes; and
        determining the first direction at least in part based on the dominant direction of the second plurality of traveling points.

6. The method of claim 5, further comprising:
    selecting, from among the second plurality of traveling points, a traveling point having a second direction other than the dominant direction; and
    adjusting the second direction of the selected traveling point based on the dominant direction.

7. The method of claim 6, further comprising:
in response to determining that one of the unmatched points is located on one of the at least two plurality of routes, classifying the unmatched point as a traveling point having the route direction of the located route.

8. A device for tracking the route trajectory of a traveling object comprising:
a processing unit;
a memory coupled to the processing unit and storing instructions thereon, the instructions, when executed by the processing unit, causing the device to perform:
obtaining positioning data from a positioning device carried on each of a respective at least one traveling object traveling on a plurality of routes;
mapping the positioning data into a plurality of points on a digital map, the digital map including a stored route trajectory along at least two of the plurality of routes, the at least two plurality of routes having different route directions, each point of the plurality of points having a traveling direction indicated by the positioning data;
identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions;
obtaining candidate transition points from the plurality of unmatched points on the digital map;
aggregating the plurality of candidate transition points by applying a clustering algorithm;
selecting a first cluster of points and a plurality of second clusters of points from the aggregated clusters of points;
determining a confidence level of whether the first cluster of points are transition points indicating a transition between the at least two plurality of routes;
classifying the first cluster of points based on the confidence level; wherein
in response to the confidence level being below a threshold confidence, classifying the first cluster of points as a plurality of traveling points having a first direction; and
in response to the confidence level being above the threshold confidence, classifying the first cluster of points as the transition points; and
automatically adjusting the stored route trajectory based on the classification of the first cluster of points.

9. The method of claim 8, wherein the first cluster of points are generated from positioning data obtained from a plurality of the traveling objects traveling on the plurality of routes and the plurality of second clusters of points are generated from positioning data obtained from a single object traveling on the plurality of routes multiple times.

10. The device of claim 8, wherein determining a confidence level comprises:
selecting, from among the plurality of second clusters of points, clusters of points such that a distance between each of the selected clusters of points and the first cluster of points is below a second threshold distance; and
in response to the number of the selected clusters of points being below a threshold number, determining that the confidence is below the threshold confidence.

11. The device of claim 8, wherein the at least two plurality of routes at least include a first route and a second route having opposite directions, and wherein determining a confidence level comprises:
determining a first travel distance from a first cluster of points to a predetermined reference transition along the first route, the predetermined reference transition representing a transition between the first and second routes;
determining a second travel distance from the predetermined reference transition to the first cluster of points along the second route;
determining a difference between the first and second travel distances; and
in response to the difference being below a threshold difference, determining that the confidence exceeds the threshold confidence.

12. The device of claim 8, wherein the classifying comprises:
determining the first direction for the first plurality of traveling points by:
determining a dominant direction of a second plurality of traveling points with respect to the first cluster of points, a distance between each of the second plurality of traveling points and the first cluster of points being below a third threshold distance, the second plurality of traveling points representing movements along the plurality of routes; and
determining the first direction at least in part based on the dominant direction of the second plurality of traveling points.

13. The device of claim 8, wherein the instructions further cause the device to:
adjusting the stored route trajectory on the map at least in part based on the classified first cluster of points.

14. The device of claim 8, further comprising a transition micro-clusters clustering module for aggregating the candidate transition points, a real transition micro-clusters detector module for verifying a confidence in identifying clusters of points as transition points and a label calibration and merge module for classifying the cluster of points.

15. The device of claim 12, wherein the instructions further cause the device to:
selecting, from among the second plurality of traveling points, a traveling point having a second direction other than the dominant direction; and
adjusting the second direction of the selected traveling point based on the dominant direction.

16. The device of claim 15, wherein the instructions further cause the device to:
in response to determining that one of the unmatched points is located on one of the at least two plurality of routes, classifying the unmatched point as a traveling point having the route direction of the located route.

17. A computer program product for tracking the route trajectory of a traveling object being tangibly stored on a non-transient machine-readable medium and comprising machine-executable instructions, the instructions, when executed on a device, causing the device to perform:
obtaining positioning data from a positioning device carried on each of a respective at least one traveling object traveling on a plurality of routes;
mapping the positioning data into a plurality of points on a digital map, the digital map including a stored route trajectory along at least two of the plurality of routes, the at least two plurality of routes having different route directions, each point of the plurality of points having a traveling direction indicated by the positioning data;

identifying points of the plurality of points on the digital map that are unmatched to the stored route trajectory along the at least two of the plurality of routes, the unmatched points being points separated from the routes by distances exceeding a first threshold distance, points located between the routes but inconsistent with the route directions, and points located on one of the routes but have directions inconsistent with the respective route directions;

obtaining candidate transition points from the plurality of unmatched points on the digital map;

aggregating the plurality of candidate transition points by applying a clustering algorithm;

selecting a first cluster of points and a plurality of second clusters of points from the aggregated clusters of points;

determining a confidence level of whether the first cluster of points are transition points indicating a transition between the at least two plurality of routes;

classifying the first cluster of points based on the confidence level; wherein in response to the confidence level being below a threshold confidence, classifying the first cluster of points as a plurality of traveling points having a first direction; and in response to the confidence level being above the threshold confidence, classifying the first cluster of points as the transition points; and automatically adjusting the stored route trajectory based on the classification of the first cluster of points.

18. The computer program product of claim 17, wherein the instructions, when executed on the device, cause the device to:

select, from among the plurality of second clusters of points, clusters of points such that a distance between each of the selected clusters of points and the first cluster of points is below a second threshold distance; and in response to the number of the selected clusters of points being below a threshold number, determine that the confidence is below the threshold confidence.

* * * * *